(12) United States Patent
Sun et al.

(10) Patent No.: US 12,097,661 B2
(45) Date of Patent: Sep. 24, 2024

(54) CONSTRUCTION METHOD OF 3D PRINTING AND WEAVING INTEGRATED BUILDING

(71) Applicant: ZHEJIANG UNIVERSITY, Zhejiang (CN)

(72) Inventors: Xiaoyan Sun, Hangzhou (CN); Hailong Wang, Hangzhou (CN); Jie Chen, Hangzhou (CN); Qun Wang, Hangzhou (CN); Chao Gao, Hangzhou (CN); Zhicheng Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 792 days.

(21) Appl. No.: 17/268,399

(22) PCT Filed: Sep. 4, 2019

(86) PCT No.: PCT/CN2019/104274
§ 371 (c)(1),
(2) Date: Feb. 12, 2021

(87) PCT Pub. No.: WO2020/048468
PCT Pub. Date: Mar. 12, 2020

(65) Prior Publication Data
US 2021/0340756 A1    Nov. 4, 2021

(30) Foreign Application Priority Data

Sep. 6, 2018 (CN) .......................... 201811038630.2

(51) Int. Cl.
B28B 23/02 (2006.01)
B28B 1/00 (2006.01)
(Continued)

(52) U.S. Cl.
CPC ............ *B29C 64/386* (2017.08); *B28B 1/001* (2013.01); *B28B 1/523* (2013.01); *B29C 64/188* (2017.08);
(Continued)

(58) Field of Classification Search
CPC ........... B28B 1/001; B28B 1/52; B28B 1/523; B28B 23/02; B29C 39/10; B29C 64/106;
(Continued)

(56) References Cited

FOREIGN PATENT DOCUMENTS

CN       104961367        10/2015
CN       105625720        6/2016
(Continued)

OTHER PUBLICATIONS

Translation of CN 109129818 A (published on Jan. 4, 2019).*
Translation of CN 109304788 A (published on Feb. 5, 2019).*

*Primary Examiner* — Leo B Tentoni
(74) *Attorney, Agent, or Firm* — Jiwen Chen; Joywin IP Law PLLC

(57) ABSTRACT

The present invention discloses a construction method of 3D printing and weaving integrated building, comprising: selecting basic building structural components, using finite element analysis after spatial modeling, and combining stress nephogram to set a discrimination domain value and optimize a structure space, obtaining a structural component skeleton; calculating and analyzing the structural component skeleton, determining a weaving range and weaving density of a wire according to weak areas and sizes under structural stress; and then determining a printing process and weaving process according to the structural component skeleton, the weaving range and the weaving density; preparing 3D printing material; 3D printing a matrix and weaving the wire according to the printing process and weaving process, constructing layer by layer, or printing segments, and then (Continued)

connecting segments by preset tenoning structural sections to form a 3D printing and weaving integrated building. The construction method of the present invention has high toughness, fatigue resistance, longevity and other advantages; so that each part of the building can not only meet the different requirements of structural mechanics, but also can achieve economic beauty and modeling art on the basis of safety and reliability.

10 Claims, 4 Drawing Sheets

(51) Int. Cl.
| | | |
|---|---|---|
| *B28B 1/52* | (2006.01) | |
| *B29C 39/10* | (2006.01) | |
| *B29C 64/106* | (2017.01) | |
| *B29C 64/188* | (2017.01) | |
| *B29C 64/386* | (2017.01) | |
| *B29C 70/68* | (2006.01) | |
| *B29C 70/70* | (2006.01) | |
| *B33Y 10/00* | (2015.01) | |
| *B33Y 50/00* | (2015.01) | |
| *E01D 21/00* | (2006.01) | |
| *E04B 1/35* | (2006.01) | |
| *E04G 21/02* | (2006.01) | |
| *E04G 21/12* | (2006.01) | |
| *E04G 21/14* | (2006.01) | |
| *G06F 30/13* | (2020.01) | |
| *G06F 30/23* | (2020.01) | |
| *B29K 77/00* | (2006.01) | |
| *B29K 305/12* | (2006.01) | |
| *B29L 31/10* | (2006.01) | |
| *G06F 113/10* | (2020.01) | |

(52) U.S. Cl.
CPC ............ *B29C 70/682* (2013.01); *B33Y 10/00* (2014.12); *B33Y 50/00* (2014.12); *E04B 1/3505* (2013.01); *E04G 21/02* (2013.01); *E04G 21/14* (2013.01); *G06F 30/13* (2020.01); *G06F 30/23* (2020.01); *B29K 2077/00* (2013.01); *B29K 2305/12* (2013.01); *B29L 2031/10* (2013.01); *G06F 2113/10* (2020.01)

(58) Field of Classification Search
CPC ..... B29C 64/386; B29C 70/682; B29C 70/70; B33Y 10/00; B33Y 50/00; C04B 20/072; E01D 21/00; E04G 21/12; G06F 30/13; G06F 30/23; G06F 2113/10
USPC .............. 264/35, 275, 279, 279.1, 308, 333; 14/77.1; 52/745.19; 703/1
See application file for complete search history.

(56) References Cited

FOREIGN PATENT DOCUMENTS

| | | | | |
|---|---|---|---|---|
| CN | 106313272 | | 1/2017 | |
| CN | 106760532 | | 5/2017 | |
| CN | 109129818 | A * | 1/2019 | ............ B28B 1/001 |
| CN | 109304788 | A * | 2/2019 | ............ B28B 1/001 |
| KR | 20180072256 | | 6/2018 | |
| WO | WO2017153790 | | 9/2017 | |

* cited by examiner

CONSTRUCTION METHOD OF 3D PRINTING AND WEAVING INTEGRATED BUILDING

This is a U.S. national stage application of PCT Application No. PCT/CN2019/104274 under 35 U.S.C. 371, filed Sep. 4, 2019 in Chinese, claiming priority of Chinese Application No. 201811038630.2, filed Sep. 6, 2018, all of which is hereby incorporated by reference.

TECHNICAL FIELD

The present invention belongs to the technical field of building construction technology, in particular to a construction method of 3D printing and weaving integrated building.

DESCRIPTION OF RELATED ART

As the strength and durability of existing printing materials have been urgently needed to be improved, the current 3D printing technology also lacks matrix and traditional reinforcement materials, such as the combination with steel bars, resulting in the printing structure type is limited by material performance, so the printing structure types are mostly small-scale civil buildings with small space and small span.

The existing 3D building materials are very abundant. CN107603162A discloses a high-strength and high-toughness 3D printing material for construction; CN107619230A discloses a concrete material for 3D printing; CN107200536A discloses a rapid prototyping 3D printing paste for construction; CN107177155A discloses a high-strength UV-resistant 3D printing material and preparation method for the construction field thereof; CN107141799A discloses an oxidation-resistant high-strength 3D printing material for construction engineering and preparation method thereof; CN107417180A discloses a graphene geopolymer cement and preparation method thereof; CN107032669A discloses a 3D printing building material. At present, the types and strength of printing materials have been significantly improved, but how to integrate printing with reinforcement material to overcome many shortcomings of using only cement-based materials to print buildings is a key technical problem to be solved at this stage.

The 3D printing matrix does not require molds and is self-made, but the 3D printing matrix is mostly brittle materials with low strength and poor deformability. The 3D printing matrix needs to be combined with a flexible, high-strength, and geometrically variable material to form a strong spatial network to ensure that the structure is in a variety of load capacity, deformation capacity and durability performance under working conditions. Traditional building steel and composite fiber materials are mostly manufactured in the form of ribs, which need to be cut, tied, and positioned according to the design to form a rigid skeleton. The construction process is complicated and difficult to integrate with the existing 3D printing technology.

At this stage, various technologies have been tried to combine 3D printing with traditional steel materials. The Chinese patent document with publication number CN106760532 A discloses a building construction method based on 3D printing, and the Chinese patent document with publication number CN 105756187A discloses a construction and construction method combining a 3D printing process with concrete. These methods all use the shaping ability of the 3D printing process to print the shell or the main support, then cut the steel bar, bind, position and hoist, and finally pour ordinary concrete in the 3D formwork to assemble the two.

These existing construction methods do not make full use of 3D printing technology to form an integrated and automated intelligent construction technology. They only use 3D printing technology to save formwork engineering, and these formwork and brackets can easily cause excessive deformation and cracking during the internal concrete pouring process. Although it is difficult for various rigid reinforcements to be integrated with 3D printed concrete for mechanized construction and shaping, various modern high-strength flexible wires, such as high-strength steel strands, steel-FRP composite wires, nano-high-strength composite wires, etc., give the integrated automatic construction a strong tough concrete structure provides a feasible way.

Therefore, how to use the existing 3D printing technology and the existing cement-based cementitious materials to combine with high-strength and high-toughness composite materials is a key issue for overcoming the many limitations of existing 3D printing buildings and manufacturing new building structures.

SUMMARY OF THE INVENTION

One object of the present invention is to provide a construction method of 3D printing and weaving integrated building. The construction method provided by the present invention solves the defects in the strength and toughness of the existing 3D printing matrix, and also makes up for the lack of structural space spanning capacity and bearing capacity. The construction method is convenient, fast and applicable, and has high toughness, fatigue resistance, longevity and other advantages; so that each part of the building not only can meet the different requirements of structural mechanics, but also can achieve economic beauty and modeling art on the basis of safety and reliability.

The present invention provides the following technical solutions:

A construction method of 3D printing and weaving integrated building, comprising the following steps:

(1) selecting basic building structural components, using finite element analysis after spatial modeling, and combining stress nephogram to set a discrimination domain value and optimize a structure space, obtaining a structural component skeleton;

(2) calculating and analyzing the structural component skeleton, determining a weaving range and weaving density of a wire according to weak areas and sizes under structural stress; and then determining a printing process and weaving process according to the structural component skeleton, the weaving range and the weaving density;

(3) preparing 3D printing material;

(4) 3D printing a matrix and weaving the wire according to the printing process and weaving process of step (2), constructing layer by layer and stacking for one-time molding to form a 3D printing and weaving integrated building; or performing segments, and then connecting segments by preset tenoning structural sections to form a 3D printing and weaving integrated building; a weaving method of the wire is as follows: in the parallel printing direction, 3D printing matrix is integrated into the wire, injecting screws at weaving location and winding the woven wire on the screws; in the vertical printing direction, injecting screws at weaving location after 3D printing matrix, weaving the wire before the 3D printing material is initially set, and the woven wire winding on the injected screws to form a spatial grid.

Wherein, the basic building structural components is selected from arch, beam, slab, column or wall.

In the step (1), a method of optimizing a structure space is selected from two-way progressive optimization algorithm, body shape topology optimization. And the body shape topology optimization is selected from the group consisting of homogenization method, variable density method, progressive structural optimization method (ESO) or horizontal set method.

In the step (2), a method of determining a weaving range and weaving density of a wire according to areas that are weak under structural stress comprising:

(2-1) determining the weaving range according to a safety factor determined by a stress/strength ratio;

(2-2) determining an encrypted weaving range and an ordinary weaving range according to the safety factor and a threshold value, and the threshold value is determined according to an actual value.

The actual value is the building importance level, the seismic fortification intensity of the region, etc.

The step (2) also comprises setting a weaving location in the weaving range of the wire for positioning the woven wire.

In the step (3), the 3D printing material is selected from one or a combination of at least two of cement-based materials, gypsum materials or nylon materials.

The 3D printing materials have the characteristics of rapid prototyping and convenient construction. Compared with ordinary cement-based materials, they have higher strength and shaping ability.

In the step (3), the 3D printing material also comprise a reinforcing component, the reinforcing component is selected from one or a combination of at least two of fibers and their polymers, expanded microbeads or hollow particles, and nanomaterials.

Wherein, the reinforcing component can be of various scales and various forms.

In the step (4), the wire is selected from one or a combination of at least two of steel strands, fiber composite wires or nanowires.

Wires are lightweight, high-strength, geometrically variable, multi-strand wires twisted and braided, with a high surface friction coefficient. Replacing steel bars with the wires to integrate with the matrix to receive the force can ensure the mechanical properties, seismic performance, and fatigue of the new strong and tough structure Performance and durability.

In the process of 3D printing the matrix structure, injecting screw can be used as a positioning needle to realize the three-dimensional weaving of the toughened wire, ensure the weaving accuracy, make the design accurately implemented, and the structure is safe and more reasonable. The parallel printing direction can be integrated into the rope, the key point injecting screw positioning ensures the geometric weaving shape, the vertical printing direction can inject the screw positioning layer by layer to form a spatial grid; in the printing matrix process, the screw is injected to achieve spatial positioning, which can ensure the printing weaving accuracy.

In the step (4), a method of printing segments is as follows: the 3D printing matrix and the wire are printed in segments and prefabricated according to the structural requirements of structural components, and then the tenoning structural sections are printed by post pouring/post tensioning method and used to connect the segments.

In the present invention, the wire is also called a rope.

Compared with the prior art, the technical effects of the present invention are embodied in:

The present invention combines the technical superiority of the existing 3D printing material rapid prototyping and the superior material properties of the high-strength wire material with light weight, high strength and geometrical change, and a certain proportion of high-strength wire is woven into the 3D printing matrix to improve the structural strength and toughness and form a new form of integrated building structure that is different from traditional reinforced concrete structures, which not only solves the shortcomings of the existing 3D printing matrix in strength and toughness, but also makes up for the lack of structural space spanning capacity and bearing capacity.

The present invention has the advantages of high toughness, fatigue resistance, long life, etc., while being convenient for construction and fast application. The present invention enables each part of the building to not only meet the different requirements of structural mechanics, but also achieve economical beauty and plastic arts on the basis of safety and reliability. The present invention eliminates the formwork and steel cage binding procedures in traditional building construction, which not only reduces the construction procedures, but also reduces labor intensity.

The 3D printing and weaving technology of the present invention is used in construction projects, which makes it easier to realize the structural facade modeling; and this construction method can also be combined with the existing reinforcements.

The present invention prints architectural components or functional accessories in layers according to a preset structural space modeling, analysis the stress nephogram, and designs suitable weaving patterns according to the printing path in different stress domains. The present invention uses 3D printing materials to print the building matrix while combining the laminated pouring process to design an internal weaving process of the structure, and controls the high-strength wire precisely woven and shaped in space by injecting screws for spatial positioning. The high-strength wire and the printing matrix form a spatially strong structure with coordinated force and uniform deformation, realizing the optimal combination of spatial forces, effectively improving the tensile, shear, abrasion and cracking properties of the 3D printing matrix, and has higher load-bearing capacity, deformation capacity, crack resistance capacity, and seismic ductility, meeting the multiple functional needs of the structure, and realizing the effective combination of spatial span and 3D modeling, making the advantages of 3D printed buildings comprehensively highlighted and no longer limited to small building structures.

The construction method provided by the present invention, for large-scale complex structures, can separately print and woven parts in different regions, and then assemble them into a whole, adopt preset tenon components and post-tensioning prestressing technology to enhance the integrity. The prepared 3D printing and weaving integrated buildings can also be combined with traditional building structures, with flexible compatibility and universality.

DETAILED DESCRIPTION OF THE INVENTION

Figure 1:
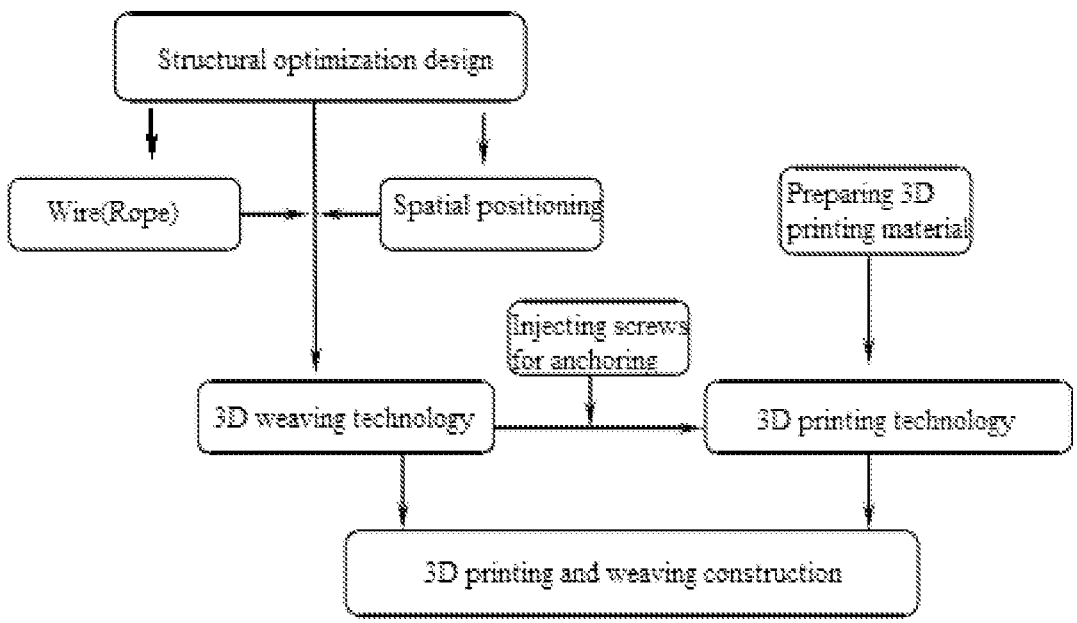
FIG. 1 is a schematic flow diagram of the construction method provided by the present invention.

The present invention will be further explained below in conjunction with the drawings and embodiments:

As shown in FIG. 1, the construction method of 3D printing and weaving integrated building comprising the following steps:
(1) selecting basic building structural components, using finite element analysis after spatial modeling, and combining stress nephogram to set a discrimination domain value and optimize a structure space, obtaining a structural component skeleton;
(2) calculating and analyzing the structural component skeleton, determining a weaving range and weaving density of a wire according to weak areas and sizes under structural stress; and then determining a printing process and weaving process according to the structural component skeleton, the weaving range and the weaving density;
(3) preparing 3D printing material;
(4) 3D printing a matrix and weaving the wire according to the printing process and weaving process of step (2), constructing layer by layer, stacking harding and one-time molding to form a 3D printing and weaving integrated building; or printing segments, and then connecting segments by preset tenoning structural sections to form a 3D printing and weaving integrated building; a weaving method of the wire is as follows: in the parallel printing direction, 3D printing matrix is integrated into the wire, injecting screws at weaving location and winding the woven wire on the screws; in the vertical printing direction, injecting screws at weaving location after 3D printing matrix, weaving the wire before the 3D printing material is initially set, and the woven wire winding on the injected screws to form a spatial grid.

Embodiment

Design space modeling portal arch model as a reference for bridge structure construction.

1. Determining a structural form and a space shape according to the structural function requirements. Bridges usually choose beam or arch structures as their main stress components. 3D printing cement-based materials usually have high compressive strength and low tensile strength. Selecting the arch structures as the main stress components of the bridge structure can make full use of the material's compressive performance to avoid structural tensile fracture failure.

Figure 2:
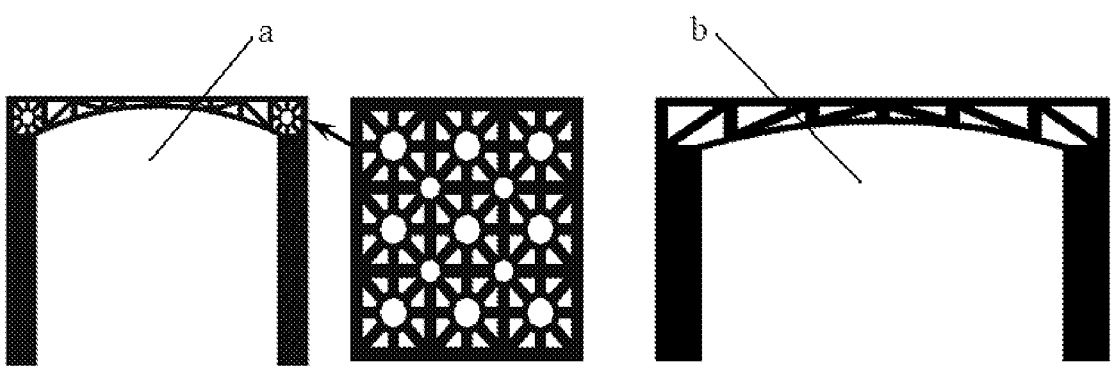
FIG. 2 is a comparison diagram of multiple schemes of spatial modeling optimization of the bridge structure in the embodiment.

The spatial modeling and structural forces of the arch structure are selected by structural topology optimization. In order to avoid missing the global optimal solution, two methods or a combination of truss discrete structure and continuum topology can be used. The optimized structure is regularized as shown in FIG. 2, including scheme a and scheme b, which can be used as a preliminary choice for the structure when 3D printing a bridge.

2. The force transmission path of the second scheme (namely scheme b) of the portal arch shown in FIG. 2 is clearer, and it is chosen as the basic form of the bridge structure for force analysis. According to the stress of the structure under the load level and the uniform stress distribution coefficient as the basis for structural optimization, the spatial layout plan of the continuum/truss composite structure is determined.

Figure 3:
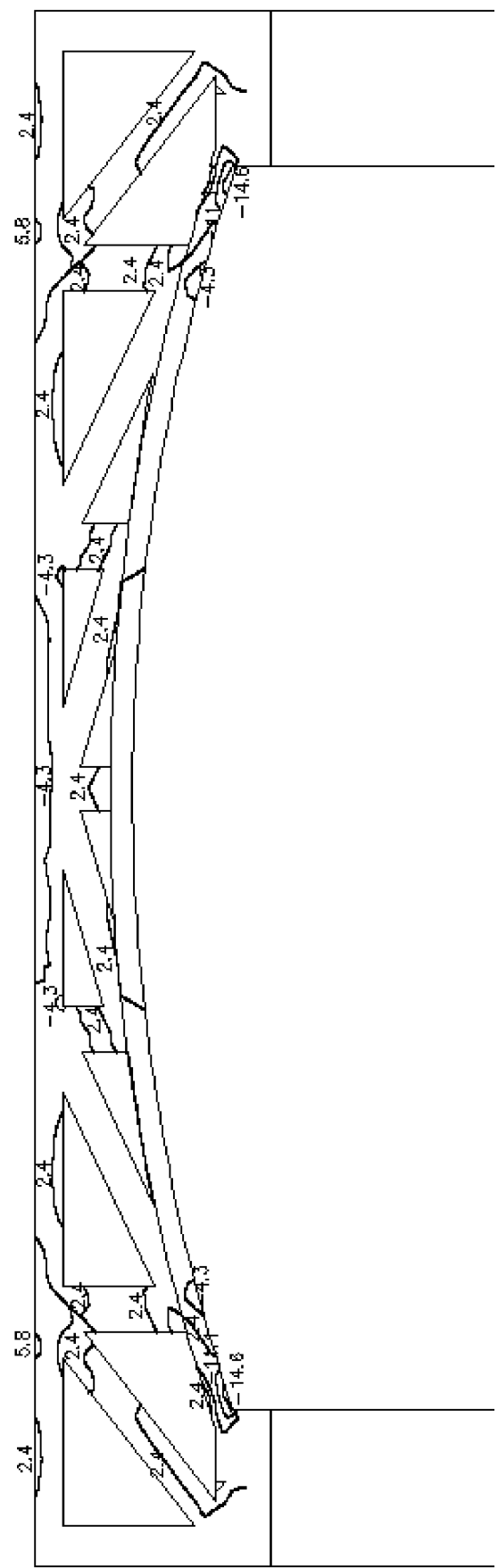
FIG. 3 is a stress distribution diagram in the x direction of the bridge structure provided by scheme b in the embodiment, wherein the stress ranges from −14.6 to 5.8.
Figure 4:
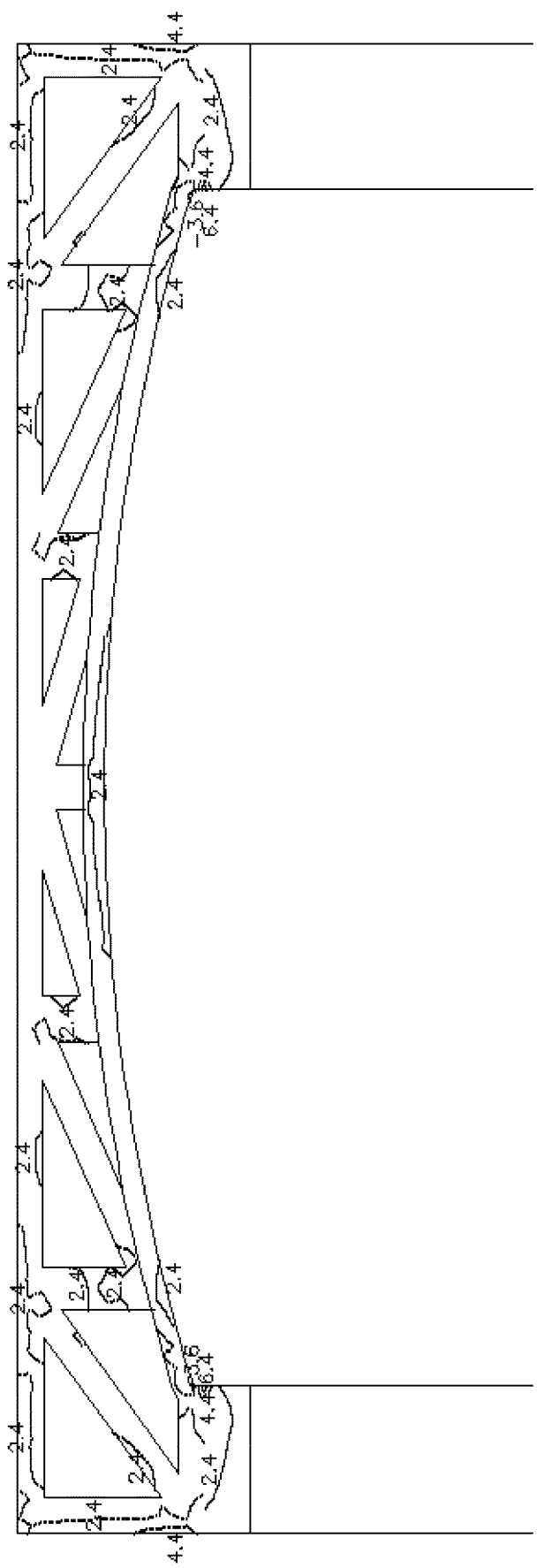
FIG. 4 is a diagram of the main tensile stress distribution of the bridge structure provided by scheme b in the embodiment, wherein the main tensile stress ranges from −3.6 to 6.4.

The stress distribution of the structure obtained based on the finite element analysis is shown in FIG. 3 and FIG. 4, where the stress in the middle part of the arch ring and the end of the arch is relatively large, which is the area that needs local reinforcement.

Figure 5:
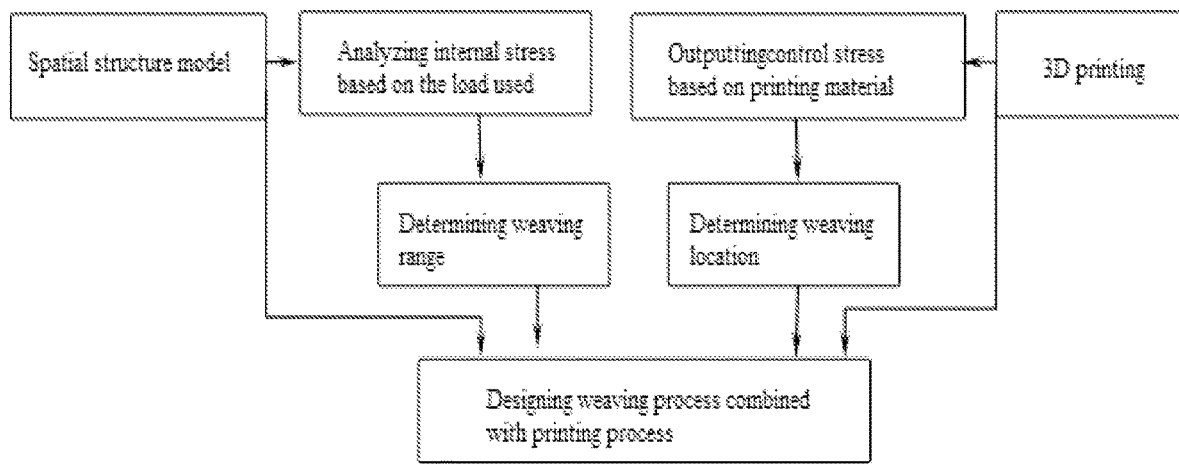
FIG. 5 is a flow chart of printing and weaving in an embodiment.

3. Determining a weaving range based on the above calculation results and the structural force threshold value. Specifically, a stress/strength ratio is used to determine a safety factor as the basis for the high-strength wire layout; and a weaving location is preset for the woven wire positioning according to the printing path within the weaving range; a threshold value of an encrypted weaving and an ordinary weaving is set to determine a regional weaving density; a printing process and a weaving process are determined according to the spatial structure type of the bridge, the weaving range and the weaving density. The process flow of printing and weaving is shown in FIG. 5.

Figure 6:
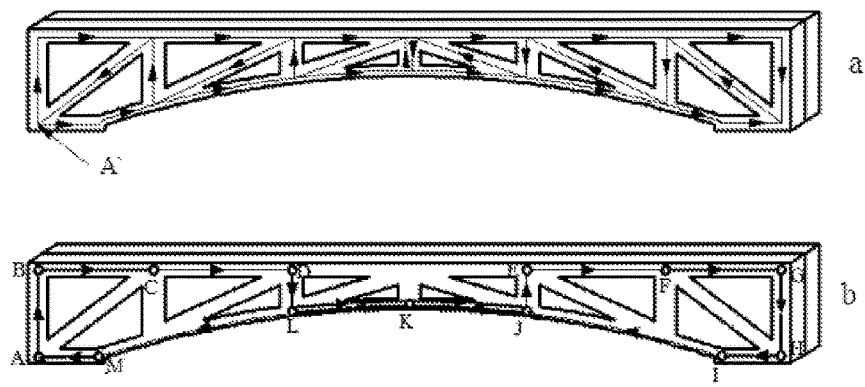
FIG. 6 is a schematic diagram of printing and weaving in the embodiment.

4. The implementation of printing and weaving is shown in FIG. 6. After the 3D printing matrix reaches a preset thickness, the printing and weaving begins. In the parallel printing direction, the wire can be directly integrated into, screws are injected at weaving location to ensure the weaving in place and the wire is properly tensioned when weaving, which is beneficial to the overall force of the printed and woven structure. In the vertical printing direction, the wire can be weaving layer by layer with the help of injected screws, the high-strength wire and 3D printing matrix are solidified, and a spatial grid stress skeleton inside is formed to improve the structure's crack resistance, deformation performance and seismic performance.

Specifically, in this embodiment, according to the set threshold value and the calculated safety factor, in FIG. 6, "a" is a schematic diagram of the printing direction, where "A'" is a printing starting point, and the arrow direction is a printing direction; "b" is a schematic diagram of the weaving direction, the arrow direction is a weaving direction, point "A" is a starting point of weaving, AB, BC, LK, KJ, FG, GH, HI, JK, KL and MA are the encrypted weaving areas, CD, DL, JE, EF, The IJ and LM sections are the ordinary weaving areas; the A-M points are the screws used for positioning that are injected at the weaving location.

5. An arch is manufactured to form by integrated molding, according to the printing and weaving process and the pre-designed structure model, layer by layer printing and weaving construction. After the components are integrally cured, they can be hoisted and assembled on site to form an integral structure.

In this embodiment, the 3D printing material is a cement-based material, and the wire is a steel strand.

The above-mentioned embodiments are only used to explain the inventive concept of the present invention, but not to limit the protection of the rights of the present invention. Any simple modifications, equivalent changes and modifications made to the above embodiments based on the essence of the technology and method of the present invention are still valid. It belongs to the scope of the technology and method scheme of the present invention.

The invention claimed is:

1. A construction method for a 3D printing and weaving integrated building, comprising the following steps:
    (1) selecting basic building structural components, using finite element analysis after spatial modeling, and combining stress nephogram to set a discrimination domain value and optimize a structure space, obtaining a structural component skeleton;
    (2) calculating and analyzing the structural component skeleton, determining a weaving range and weaving density of a wire according to weak areas and sizes under structural stress; and then determining a printing process and weaving process according to the structural component skeleton, the weaving range and the weaving density;
    (3) preparing 3D printing material;
    (4) 3D printing a matrix and weaving the wire according to the printing process and weaving process of step (2), constructing layer by layer, stacking hardening and one-time molding to form a 3D printing and weaving integrated building; or printing segments, and then connecting segments by preset tenoning structural sections to form a 3D printing and weaving integrated building; a weaving method of the wire is as follows: in a parallel printing direction, 3D printing matrix is integrated into the wire, injecting screws at weaving location and winding woven wire on the screws; in a vertical printing direction, injecting screws at weaving location after 3D printing matrix, weaving the wire before the 3D printing material is initially set, and the woven wire winding on the injected screws to form a spatial grid.

2. The construction method according to claim 1, wherein, in the step (2), a method of determining a weaving range and weaving density of a wire according to weak areas and sizes under structural stress is as follows:
    (2-1) determining the weaving range according to a safety factor determined by a stress/strength ratio;
    (2-2) determining a encrypted weaving range and an ordinary weaving range according to the safety factor and a threshold value, and the threshold value is determined according to an actual value.

3. The construction method according to claim 1, wherein, the step (2) comprises setting a weaving location in the weaving range of the wire for positioning the woven wire.

4. The construction method according to claim 1, wherein, in the step (3), the 3D printing material is selected from one or a combination of at least two of cement-based materials, gypsum materials or nylon materials.

5. The construction method according to claim 1, wherein, in the step (3), the 3D printing material also comprise a reinforcing component, the reinforcing component is selected from one or a combination of at least two of fibers and their polymers, expanded microbeads or hollow particles, and nanomaterials.

6. The construction method according to claim 1, wherein, in the step (4), the wire is selected from one or a combination of at least two of steel strands, fiber composite wires or nanowires.

7. The construction method according to claim 1, wherein, in the step (4), a method of printing segments is as follows: the 3D printing matrix and the wire are segmented printed and prefabricated according to the structural requirements of structural components, and then the tenoning structural sections are printed by post pouring/post tensioning method and used to connect the segments.

8. The construction method according to claim 2, wherein, the step (2) comprises setting a weaving location in the weaving range of the wire for positioning the woven wire.

9. The construction method according to claim 2, wherein, in the step (3), the 3D printing material is selected from one or a combination of at least two of cement-based materials, gypsum materials or nylon materials.

10. The construction method according to claim 2, wherein, in the step (3), the 3D printing material also comprise a reinforcing component, the reinforcing component is selected from one or a combination of at least two of fibers and their polymers, expanded microbeads or hollow particles, and nanomaterials.

* * * * *